(No Model.)

F. D. MAYO.
SCREW CUTTING DIE.

No. 309,237. Patented Dec. 16, 1884.

Witnesses.
S. N. Piper
E. B. Pratt.

Inventor.
Frederick David Mayo.
by R. K. Eddy atty.

UNITED STATES PATENT OFFICE.

FREDERICK DAVID MAYO, OF LYNN, MASSACHUSETTS, ASSIGNOR, BY MESNE ASSIGNMENTS, TO HIMSELF, AND SULLIVAN H. ATKINS, OF MILTON MILLS, NEW HAMPSHIRE.

SCREW-CUTTING DIE.

SPECIFICATION forming part of Letters Patent No. 309,237, dated December 16, 1884.

Application filed February 18, 1884. (No model.)

*To all whom it may concern:*

Be it known that I, FREDERICK DAVID MAYO, of Lynn, in the county of Essex, of the Commonwealth of Massachusetts, have invented a new and useful Improvement in Screw-Cutting Dies; and I do hereby declare the same to be described in the following specification and represented in the accompanying drawings, of which—

Figure 1:
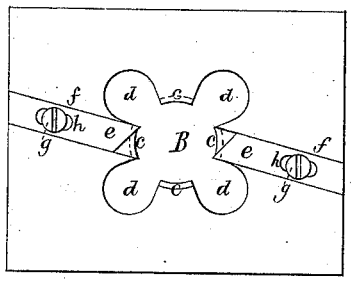
Figure 2:
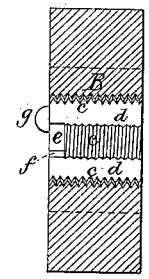
Figure 3:
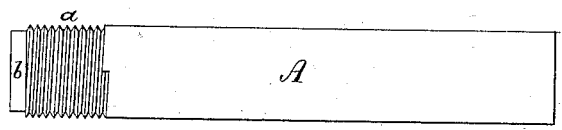

Figure 1 is a top view, and Fig. 2 a transverse section, of a screw-cutting die containing my invention, the nature of which is defined in the claim hereinafter presented. Fig. 3 is a side view of a piece of pipe with a screw and guide projection, as cut by the said die.

The die is not only to form on a rod or pipe a screw-thread, but a short cylindrical projection in advance of it, to guide it properly in entering a female screw and prevent overridding of the threads of the two screws. In Fig. 3 the screw is shown at $a$ and the cylindrical projection at $b$, the pipe on which the two are cut being represented at A.

The die for cutting the screw is shown at B as not only made in the ordinary way—viz., with screw-thread cutters $c$ and chip-discharging spaces $d$ between them, but as provided with one or more chisels or cutters, $e$, arranged as shown, for cutting the cylindrical projection, each of the said cutters $e$ being disposed in a groove, $f$, in the face of the die-block B and held therein by a clamp-screw, $g$, going through a slot, $h$, in the cutter, and screwed into the block. By the operation of this die the screw-thread will be formed on the pipe or rod from its end inward, and will be cut down or sheared off from such rod to the distance required for the length of the guide or projection $b$.

I do not claim a screw-cutting arbor provided with screw-cutters and a pointing-tool arranged in it, as shown in the United States Patents Nos. 45,452 and 211,053, such pointing-tool being within the tubular part of the arbor and arranged at right angles to the general plane of the screw-thread cutters.

I claim—

The die-block having the screw-thread cutters $c$, and chip-discharging spaces $d$ arranged between them, as represented, and also having one or more grooves, $f$, in its face, and in each an adjustable cutter, $e$, slotted and furnished with a clamp-screw going through it and into the block, all being substantially as set forth.

FREDERICK DAVID MAYO.

Witnesses:
R. H. EDDY,
E. B. PRATT.